(12) United States Patent  (10) Patent No.: US 8,205,153 B2
Chenthamarakshan et al.  (45) Date of Patent: Jun. 19, 2012

(54) INFORMATION EXTRACTION COMBINING SPATIAL AND TEXTUAL LAYOUT CUES

(75) Inventors: Vijil Enara Chenthamarakshan, Bangalore (IN); Prasad Manikarao Deshpande, Bangalore (IN); Raghuram Krishnapuram, Bangalore (IN); Ramakrishna Varadarajan, Madison, WI (US)

(73) Assignee: International Business Machines Corporation, Armonk, NY (US)

( * ) Notice: Subject to any disclaimer, the term of this patent is extended or adjusted under 35 U.S.C. 154(b) by 352 days.

(21) Appl. No.: 12/546,925

(22) Filed: Aug. 25, 2009

(65) Prior Publication Data
US 2011/0055285 A1   Mar. 3, 2011

(51) Int. Cl.
*G06F 17/00*   (2006.01)
(52) U.S. Cl. ........................................................ 715/246
(58) Field of Classification Search .................. 715/243, 715/246, 248, 273, 277
See application file for complete search history.

(56) References Cited

U.S. PATENT DOCUMENTS

| | | | |
|---|---|---|---|
| 4,498,147 A * | 2/1985 | Agnew et al. | 715/236 |
| 5,983,218 A * | 11/1999 | Syeda-Mahmood | 707/769 |
| 6,377,288 B1 * | 4/2002 | Moran et al. | 715/863 |
| 6,573,907 B1 * | 6/2003 | Madrane | 715/719 |
| 7,421,651 B2 | 9/2008 | Egnor | |
| 2004/0193520 A1 * | 9/2004 | LaComb et al. | 705/35 |
| 2006/0170693 A1 * | 8/2006 | Bethune et al. | 345/568 |
| 2007/0038927 A1 * | 2/2007 | Dallett et al. | 715/513 |
| 2007/0132767 A1 * | 6/2007 | Wright et al. | 345/475 |
| 2007/0174291 A1 * | 7/2007 | Cooper et al. | 707/10 |
| 2007/0266332 A1 * | 11/2007 | Jubinski | 715/766 |
| 2008/0294679 A1 * | 11/2008 | Gatterbauer et al. | 707/102 |
| 2009/0150769 A1 * | 6/2009 | Konnola et al. | 715/251 |
| 2010/0088586 A1 * | 4/2010 | Roudot | 715/229 |

OTHER PUBLICATIONS

Dilorio, Angelo, et al, "Higher-level Layout Through Topological Abstraction", DocEng '08: Proceedings of the Eighth ACM Symposium on Document Engineering, Sep. 2008, pp. 90-99.*
Appelt et al. The common pattern specification language. In Proceedings of a workshop on held at Baltimore, Maryland, pp. 23-30, Morristown, NJ, USA, 1996. Association for Computational Linguistics.
Bird et al. Atlas: A flexible and extensible architecture for linguistic annotation. CoRR, cs.CL/0007022, 2000.
Cai et al. Vips: a vision-based page segmentation algorithm. Technical report, Microsoft Research, 2003.
Chandel et al. Efficient batch top-k search for dictionary-based entity recognition. In ICDE '06, p. 28, Washington, DC, USA, 2006. IEEE Computer Society.
Cunningham et al. Gate- a general architecture for text engineering, 1996.
DeRose et al. Building structured web community portals: a top-down, compositional, and incremental approach. In VLDB '07: Proceedings of the 33rd international conference on Very large data bases, pp. 399-410. VLDB Endowment, 2007.
Ferrucci et al. Uima: an architectural approach to unstructured information processing in the corporate research environment. Nat. Lang. Eng., 10(3-4):327-348, 2004.

(Continued)

*Primary Examiner* — Laurie Ries
(74) *Attorney, Agent, or Firm* — Ryan, Mason & Lewis, LLP

(57) ABSTRACT

Techniques for extracting information from a formatted document are provided. The techniques include combining one or more visual layout rules, one or more mark-up rules and one or more text-based rules in connection with a formatted document, and specifying one or more rules from the one or more visual layout rules, one or more mark-up rules and one or more text based rules to extract information from the formatted document.

25 Claims, 3 Drawing Sheets

OTHER PUBLICATIONS

Gatterbauer et al. Towards domain-independent information extraction from web tables. In WWW '07, pp. 71-80, Baniff, Alberta, Canada, 2007. ACM.
Gu et al. Visual based content understanding towards web adaptation. In AH '02, pp. 164-173, London, UK, 2002. Springer-Verlag.
Ipeirotis et al. Towards a query optimizer for text-centric tasks. ACM TODS, 32 (4):21, 2007.
Kovacevic et al. Recognition of common areas in a web page using visual information: a possible application in a page classification. In ICDM '02, p. 250, Washington, DC, USA, 2002. IEEE Computer Society.
Krishnamurthy et al. Systemt: a system for declarative information extraction. SIGMOD Record, 37(4):7-13, 2008.
Krupl et al. Using visual cues for extraction of tabular data from arbitrary html documents. WWW '05, pp. 1000-1001,2005.
Lafferty et al. Conditional Random Fields: Probabilistic Models for Segmenting and Labeling Sequence Data, 2001.
Lerman et al. Using the structure of web sites for automatic segmentation of tables. In SIGMOD '04, pp. 119-130, New York, NY, USA, 2004. ACM.
Peng et al. Accurate information extraction from research papers using conditional random fields. In HLT-NAACL04, pp. 329-336,2004.
Pollak et al. Creating permanent test collections of web pages for information extraction research. In SOFSEM (2), pp. 103-115, 2007.
Ramakrishnan et al. Entity annotation based on inverse index operations. In EMNLP' 06, pp. 492-500, Sydney, Australia, Jul. 2006. Association for Computational Linguistics.
Reiss et al. An algebraic approach to rule-based information extraction. In ICDE '08, pp. 933-942, 2008.
Shen et al. Declarative information extraction using datalog with embedded extraction predicates. In VLDB '07, pp. 1033-1044, Vienna, Austria, 2007. VLDB Endowment.
Simon et al. Viper: augmenting automatic information extraction with visual perceptions. In CIKM '05, pp. 381-388, New York, NY, USA, 2005. ACM.
Yang et al. Html page analysis based on visual cues. In ICDAR, pp. 859-864, 2001.
Zhai et al. Web data extraction based on partial tree alignment. In WWW '05, pp. 76-85, New York, NY, USA, 2005. ACM.
Zhao et al. Fully automatic wrapper generation for search engines. In WWW Conference, pp. 66-75, 2005.
A General Approach for Partitioning Web Page Content Based on Geometric and Style Information, downloaded Apr. 2, 2010, pp. 1-5.
Oquel—Ontological Query Language, downloaded Feb. 10, 2009, pp. 1-4.

* cited by examiner

Directional Predicates
- *NorthOf* (Region r1, Region r2) (returns *Boolean*)
- *StrictNorthOf* (Region r1, Region r2)

Grouping Operators
- *HorizontallyAligned* (Region Set R) returns horizontally aligned subgroups of region set R.
- *VerticallyAligned* (Region Set R) returns vertically aligned subgroups of region set R.

Generalization/Specialization Operators
- *MinimalSuperRegion* (Region set R) returns the smallest region that contains all regions in set R.
- *MaximalRegion* (Region r) returns the largest region, s that contains r and also has the same text content as r.
- *MinimalRegion* (Region r) returns the smallest region, s that is contained in r and also has the same text content as r.

Containment Operators
- *Contains* (Region r1, Region r2)
- *Within* (Region r1, Region r2)
- *Touches* (Region r1, Region r2)
- *Intersects* (Region r1, Region r2)

Geometrical Operators
- *Area* (Region R)
- *Centroid* (Region R)

Distance Operators
- *GapBetween* (Region r1, Region r2) returns the distance between 2 regions that are either horizontally or vertically aligned. Returns 0 when the 2 regions touch each other in their boundaries.
- *FindRegions* (Text Pattern p) returns regions with text pattern p.

INFORMATION EXTRACTION COMBINING SPATIAL AND TEXTUAL LAYOUT CUES

FIELD OF THE INVENTION

Embodiments of the invention generally relate to information technology, and, more particularly, to information extraction.

BACKGROUND OF THE INVENTION

Information in Web pages and formatted documents are designed for human consumption and, hence, exhibit some visual pattern. The document author communicates this abstract visual pattern to the web browser using a specification language (for example, hypertext markup language (HTML), cascading style sheets (CSS), Javascript Code, etc.). Humans typically do not look at the specification language to understand the data. Rather, they look at the rendered version of the page through a browser. However, existing rule-based information extraction (IE) frameworks do not deal with visual representations of a page. Instead, existing approaches look for patterns in the specification language. Thus, any rules that intend to exploit the visual cues in the layout need to be translated into equivalent rules based on the source code of the page.

As such, existing IE approaches have serious limitations, including, for example, the following. An abstract visual pattern can be implemented in many different ways by the web designer. For example, a tabular structure can be implemented using any of <table>, <div> and <li> tags, and only a fraction of tables are implemented using the <table> tag. Source-based rules that use layout cues need to cover all possible ways in which the layout can be achieved. A rule that relies on a specific implementation will fail on pages that use a different implementation, even if these pages exhibit the same visual pattern.

Also, with existing approaches, the proximity of two entities in the HTML source code does not necessarily imply visual proximity, and so it may not be possible to encode visual proximity cues using simple source based rules. Additionally, rules based on HTML tags and document object model (DOM) trees are often sensitive to even minor modifications of the web page, and rule maintenance becomes messy.

Further, challenges exist in pure text-based information extraction systems. For example, specification languages are becoming more complex and difficult to analyze. Also, visualization logic in Javascript and CSS prevent text based analysis. Further, there can be errors in the markup code, but browsers can still render the page accurately in most cases, and spatial layout based rules would be more robust to these kinds of errors.

SUMMARY OF THE INVENTION

Principles and embodiments of the invention provide techniques for information extraction combining spatial and textual layout cues. An exemplary method (which may be computer-implemented) for extracting information from a formatted document, according to one aspect of the invention, can include steps of combining one or more visual layout rules, one or more mark-up rules and one or more text-based rules in connection with a formatted document, and specifying one or more rules from the one or more visual layout rules, one or more mark-up rules and one or more text based rules to extract information from the formatted document.

One or more embodiments of the invention or elements thereof can be implemented in the form of a computer product including a tangible computer readable storage medium with computer usable program code for performing the method steps indicated. Furthermore, one or more embodiments of the invention or elements thereof can be implemented in the form of an apparatus including a memory and at least one processor that is coupled to the memory and operative to perform exemplary method steps. Yet further, in another aspect, one or more embodiments of the invention or elements thereof can be implemented in the form of means for carrying out one or more of the method steps described herein; the means can include (i) hardware module(s), (ii) software module(s), or (iii) a combination of hardware and software modules; any of (i)-(iii) implement the specific techniques set forth herein, and the software modules are stored in a tangible computer-readable storage medium (or multiple such media).

These and other objects, features and advantages of the present invention will become apparent from the following detailed description of illustrative embodiments thereof, which is to be read in connection with the accompanying drawings.

BRIEF DESCRIPTION OF THE DRAWINGS

FIG. 2 is a diagram illustrating visual operator algebra, according to an embodiment of the present invention;

DETAILED DESCRIPTION

Figure 1:
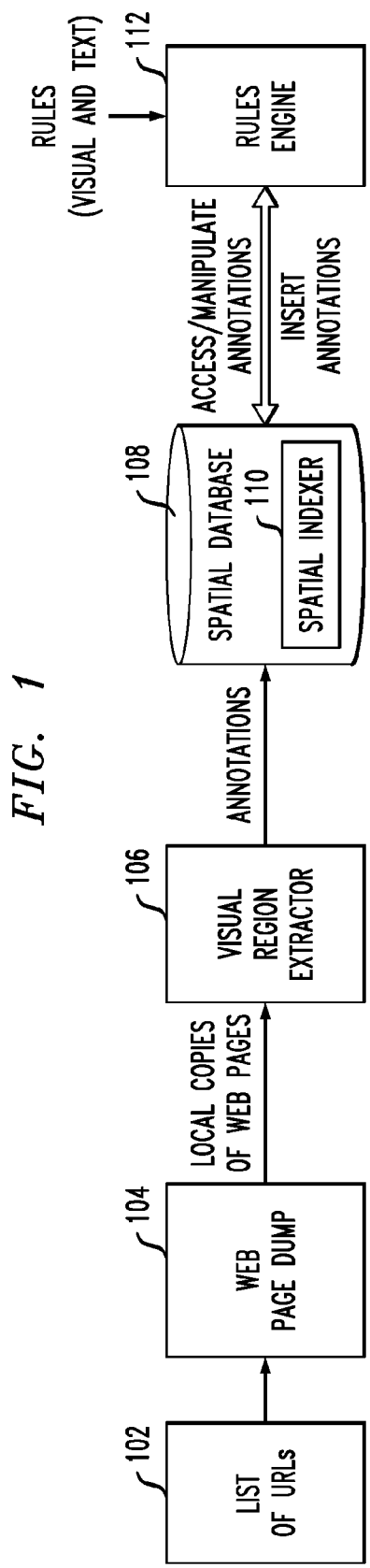
FIG. 1 is a block diagram illustrating an exemplary embodiment, according to an aspect of the invention.

Principles of the invention include information extraction using a combination of spatial layout based and text based rules. One or more embodiments of the invention include specifying rules (or algebra) for information extraction from formatted documents (for example, web pages) that combine visual layout information, text-based features and markup-based rules. Visual layout information, for example, of a web page, can include information such as relative locations of different regions, etc. The techniques described herein also include indexing web pages and visual regions therein using the visual layout information and storing them in a database to enable efficient information extraction.

Additionally, one or more embodiments of the invention include enabling the building of applications that need to use visual layout for information extraction. For example, this could include extracting system requirements and dependencies of software products, mining contracts for compliance, comparison shopping, etc. Further, as detailed herein, one or more embodiments of the invention include an efficient rule-based information extraction framework that combines visual and markup based rules. The visual information extraction framework allows use of visual information in a rendered web page. Also, rules can be specified in terms of the visual layout of the page along with source code.

The techniques described herein additionally include visual operator algebra for extracting regions from a web page based on their relative locations. This algebra can be, for example, rich enough to specify most of the commonly occurring patterns. By way of example, a single page can have around 10,000 visual regions. As such, one or more embodiments of the invention include efficiently retrieving the regions of interest and performing complex operations on them. Further, the visual operator algebra can be implemented using a geographical (spatial) database. A geographic information system (GIS) database can be used to store, query and retrieve visual regions of a web page. The operator algebra can also be implemented using a regular relational database.

As detailed herein, one or more embodiments of the invention include using spatial layout rules, where such rules can include specification of the direction of a region with respect to another other, the area of a region, the location of a region within other regions, the alignment of a set of regions, the distance between regions, etc. Such rules can also include some property of the region such as text, font size, the hypertext markup language (HTML) tag, etc.

Additionally, one or more embodiments of the invention can include storing annotations with the associated visual region and formatting information extracted from a formatted document in a database. The techniques detailed herein can also include indexing regions extracted from a formatted document using a spatial database or a custom index structure to enable scalable and efficient implementation of rules with visual constraints. Further, visual rules can be combined with other rules on the source code of a web page (text-based rules).

By way of example, sample scenarios can include horizontally aligned regions with no gaps, vertically aligned regions with no gaps, etc. For vertically aligned regions (with large gaps), for example, functions used for information extraction can include, for example, SouthOf and NorthOf. Additionally, text-based rules can be used to identify operating systems and/or product names, version numbers, etc., and can also be combined with visual rules.

FIG. 1 is a block diagram illustrating an exemplary embodiment, according to an aspect of the invention. By way of illustration, FIG. 1 depicts a list of uniform resource locators (URLs) 102, which provides input to a web page dump 104, which can be implemented as a browser extension and also provide local copies of web pages to a visual region extractor module 106, which provides annotations to a spatial database module 108. Annotations can include, for example, span, type-specific attributes, visual region, formatting attributes, etc.

The visual region extractor module 106 extracts of all the visual regions of all web pages stored locally by web page dump 104 by rendering the local copy of the web page in a web browser and using browser application programming interfaces (APIs) to query for the coordinates of each node in the document object model (DOM) tree of the web page. The rendering can also be done on the online version of the webpage by passing the uniform resource locator (URL). A visual region represents a visual box in the layout of a web page and has the attributes: $<x_l, y_l, x_h, y_h,>$. $(x_l, y_l)$ and $(x_h, y_h)$ denote the bounding box of the identified region in the visual layout of the document. One can assume that the regions are rectangles, which applies to most markup languages such as hypertext markup language (html). For example, html uses a box model for visual layout in which each html element is mapped to a rectangular area in the layout of the page.

The spatial database module 108 includes a spatial indexer module 110, and also interacts with a rules engine module 112 (which receives visual rules and text rules). The spatial indexer module 110 creates indexes on the regions to make the evaluation of visual rules faster. The spatial indexer can also be implemented using a relational database. The rules engine module 112 processes the rules and converts them into queries that can be understood by the spatial database module. The output of the rules engine module 112 is a set of annotations that satisfy the rules.

FIG. 2 is a diagram illustrating visual operator algebra 202, according to an embodiment of the present invention. By way of illustration, FIG. 2 depicts a portion of a framework that can include formal algebra of useful operations over visual regions and an engine to implement a combination of visual and text based rules.

One or more embodiments of the invention include operators in the algebra to enable writing of rules based on visual regions. The operators can be classified as span generating, scalar or grouping operators.

Span generating operators produce a set of visual spans as output and examples are listed in the table below:

| Operator | Explanation |
| --- | --- |
| $\Re(d)$ | Return all the visual spans for the document d |
| Ancestors(vs) | Return all ancestor visual spans of vs |
| Descendents(vs) | Return all descendent visual spans of vs |

The operator $\Re(d)$ returns all visual spans corresponding to a page and is can be used to start visual analysis of a page. The HTML DOM tree can have a hierarchical structure and the regions corresponding to the nodes can also follow the same relationships. The region corresponding to the visual span of a parent in the HTML tree can contain the region corresponding to its child, and the span of the parent also contains the span of the child. The ancestor and descendent operators are used to generate all ancestor and descendent visual spans of an input visual span, respectively.

Scalar operators can take as input one or more values from a single tuple and return a single value. Scalar operators that return Boolean values are called Boolean operators and can be used in predicates and are further classified as directional or containment operators. The directional operators allow visual spans to be compared based on their positions in the layout. Exemplary directional Boolean operators are listed in the table below:

| Predicate | Explanation |
| --- | --- |
| NorthOf($vs_1$, $vs_2$) | Span $vs_1$ occurs above span $vs_2$ in the page layout |
| StrictNorthOf($vs_1$, $vs_2$) | Span $vs_1$ occurs strictly above span $vs_2$ in the page |
| SouthOf($vs_1$, $vs_2$) | Span $vs_1$ occurs below span $vs_2$ in the page layout |
| StrictSouthOf($vs_1$, $vs_2$) | Span $vs_1$ occurs strictly below span $vs_2$ in the page |
| EastOf($vs_1$, $vs_2$) | Span $vs_1$ occurs to the right of span $vs_2$ in the page layout |
| StrictEastOf($vs_1$, $vs_2$) | Span $vs_1$ occurs strictly to the right of span $vs_2$ in the page |
| WestOf($vs_1$, $vs_2$) | Span $vs_1$ occurs to the left of span $vs_2$ in the page layout |
| StrictWestOf($vs_1$, $vs_2$) | Span $vs_1$ occurs strictly to the left of span $vs_2$ in the page |
| NorthWestOf($vs_1$, $vs_2$) | $vs_1$ occurs above and left of span $vs_2$ in the page |
| SouthWestOf($vs_1$, $vs_2$) | $vs_1$ occurs below and left of span $vs_2$ in the page |
| NorthEastOf($vs_1$, $vs_2$) | $vs_1$ occurs above and right of span $vs_2$ in the page |
| SouthEastOf($vs_1$, $vs_2$) | $vs_1$ occurs below and right of span $vs_2$ in the page |

Exemplary containment Boolean operators are listed in the table below:

| Predicate | Explanation |
| --- | --- |
| Contains(vs$_1$, vs$_2$) | vs$_1$ is contained within vs$_2$ |
| Touches(vs$_1$, vs$_2$) | vs$_1$ touches vs$_2$ on one of the four edges |
| Intersects(vs$_1$, vs$_2$) | vs$_1$ and vs$_2$ intersect |

Note that these operators can also be expressed using regular comparison operators on the bounding box coordinates. For example, StrictNorthOf(vs$_1$, vs$_2$) corresponds to the expression $vs_1.y_h \leq vs_2.y_l$ & $vs_1.x_l \geq vs_2.x_l$ & $vs_1.x_h \leq vs_2.x_h$. However, they have been provided in the algebra to make the rules more readable and short. Other scalar operators include the generalization and/or specialization operators and the geometric operators as listed in the tables below:

| Operator | Explanation |
| --- | --- |
| MaximalRegion(vs) | Returns the largest visual span vs$_m$ that contains vs and also has the same text content as vs$_1$ |
| MinimalRegion(vs) | Returns the smallest visual span vs$_m$ that is contained in vs and also has the same text content as vs |
| Area(vs) | Returns the area corresponding to vs |
| Centroid(vs) | Returns a visual span that has x and y coordinates corresponding to the centroid of vs and text span identical to vs |

Many HTML elements in a nested HTML source may actually have identical text content. The MinimalRegion and MaximalRegion operators can be used to find the visual span corresponding to the innermost or the outermost HTML element, respectively.

Grouping operators are used to group multiple tuples based on some criteria and apply an aggregation function to each group (for example, similar to the GROUP BY functionality in structure query language (SQL)). Exemplary grouping operators and the aggregation operators specific to visual spans are listed in the tables below, respectively:

| Operator | Explanation |
| --- | --- |
| HorizontallyAligned(V S, consecutive, maxdist) | Returns groups of horizontally aligned visual spans from V S. If the consecutive flag is set, the visual spans have to be consecutive with no non-aligned span in between. The maxdist limits the maximum distance possible between two consecutive visual spans in a group. |
| VerticallyAligned(V S, consecutive, maxdist) | Returns groups of vertically aligned visual spans from V S. If the consecutive flag is set, the visual spans have to be consecutive with no non-aligned span in between. The maxdist limits the maximum distance possible between two consecutive visual spans in a group. |
| MinimalSuperRegion(V S) | Returns the smallest visual span that contains all the visual spans in set V S |
| MinimalBoundingRegion(V S) | Returns a region that is a minimum bounding rectangle of all visual spans in set V S |

Figure 3:
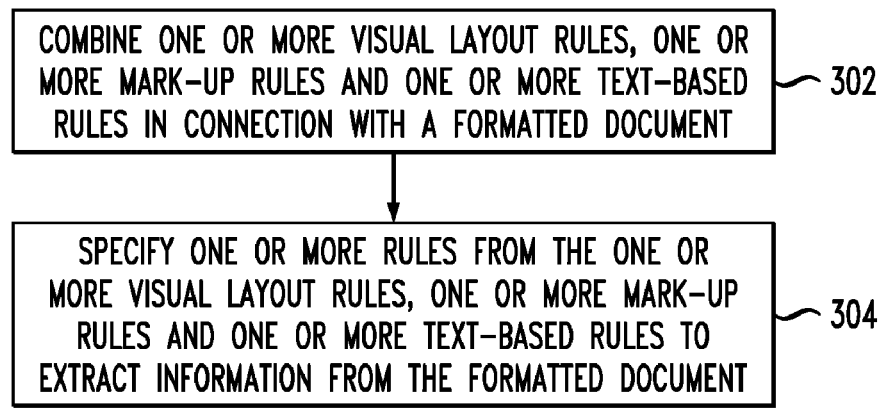
FIG. 3 is a flow diagram illustrating techniques for extracting information from a formatted document, according to an embodiment of the invention.

FIG. 3 is a flow diagram illustrating techniques for extracting information from a formatted document, according to an embodiment of the present invention. Step 302 includes combining one or more visual layout rules, one or more mark-up rules and one or more text-based rules in connection with a formatted document. By way of example, a user can combine visual layout rules with other rules on the source code of the web page. Additionally, in one or more embodiments of the invention, the specific rules combined can depend on the task at hand and can be subjective (for example, determined by a user).

The visual layout rules can include, for example, specification of a direction of a region with respect to another region, an area of a region, a location of a region within one or more additional regions, an alignment of a set of one or more regions, a distance between two or more regions and/or a property of a region (for example, text, font size, HTML tag, etc.). Also, the layout rules can include an aggregation operator.

Step 304 includes specifying one or more rules from the one or more visual layout rules, one or more mark-up rules and one or more text based rules to extract information from the formatted document.

The techniques depicted in FIG. 3 can also include storing one or more annotations with an associated visual region, as well as formatting information extracted from a formatted document in a database. Additionally, one or more embodiments of the invention include indexing each region extracted from a formatted document using a spatial database and/or a custom index structure (for example, to enable efficient implementation of rules with visual constraints). Further, the techniques described herein can include using a text index in combination with a spatial index for efficient implementation of one or more rules combining text and spatial layout based rules.

The techniques depicted in FIG. 3 can also, as described herein, be run on a system, wherein the system includes distinct software modules, each of the distinct software modules being embodied on a tangible computer-readable recordable storage medium. The distinct software modules can include, for example, a visual region extractor module, a spatial database module, a spatial indexer module and a rules engine module executing on a hardware processor.

Additionally, the techniques depicted in FIG. 3 can be implemented via a computer program product that can include computer useable program code that is stored in a computer readable storage medium in a data processing system, and wherein the computer useable program code was downloaded over a network from a remote data processing system. Also, in one or more embodiments of the invention, the computer program product can include computer useable program code that is stored in a computer readable storage medium in a server data processing system, and wherein the computer useable program code are downloaded over a network to a remote data processing system for use in a computer readable storage medium with the remote system.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

One or more embodiments of the invention, or elements thereof, can be implemented in the form of an apparatus including a memory and at least one processor that is coupled to the memory and operative to perform exemplary method steps.

Figure 4:
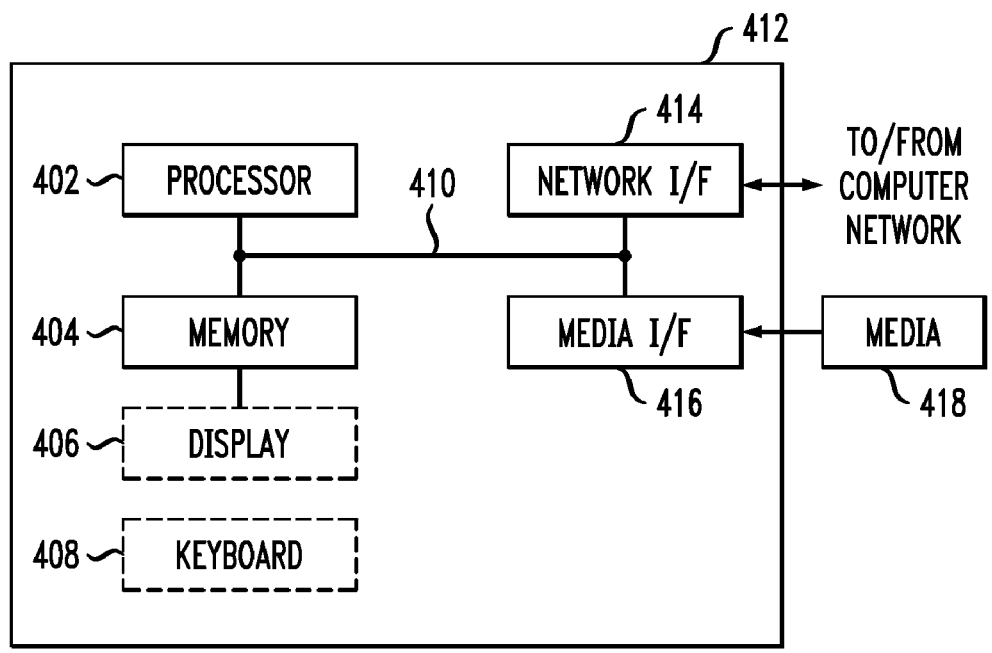
FIG. 4 is a system diagram of an exemplary computer system on which at least one embodiment of the invention can be implemented.

One or more embodiments can make use of software running on a general purpose computer or workstation. With reference to FIG. 4, such an implementation might employ, for example, a processor 402, a memory 404, and an input/output interface formed, for example, by a display 406 and a keyboard 408. The term "processor" as used herein is intended to include any processing device, such as, for example, one that includes a CPU (central processing unit) and/or other forms of processing circuitry. Further, the term "processor" may refer to more than one individual processor. The term "memory" is intended to include memory associated with a processor or CPU, such as, for example, RAM (random access memory), ROM (read only memory), a fixed memory device (for example, hard drive), a removable memory device (for example, diskette), a flash memory and the like. In addition, the phrase "input/output interface" as used herein, is intended to include, for example, one or more mechanisms for inputting data to the processing unit (for example, mouse), and one or more mechanisms for providing results associated with the processing unit (for example, printer). The processor 402, memory 404, and input/output interface such as display 406 and keyboard 408 can be interconnected, for example, via bus 410 as part of a data processing unit 412. Suitable interconnections, for example via bus 410, can also be provided to a network interface 414, such as a network card, which can be provided to interface with a computer network, and to a media interface 416, such as a diskette or CD-ROM drive, which can be provided to interface with media 418.

Accordingly, computer software including instructions or code for performing the methodologies of the invention, as described herein, may be stored in one or more of the associated memory devices (for example, ROM, fixed or removable memory) and, when ready to be utilized, loaded in part or in whole (for example, into RAM) and implemented by a CPU. Such software could include, but is not limited to, firmware, resident software, microcode, and the like.

A data processing system suitable for storing and/or implementing program code will include at least one processor 402 coupled directly or indirectly to memory elements 404 through a system bus 410. The memory elements can include local memory employed during actual implementation of the program code, bulk storage, and cache memories which provide temporary storage of at least some program code in order to reduce the number of times code must be retrieved from bulk storage during implementation.

Input/output or I/O devices (including but not limited to keyboards 408, displays 406, pointing devices, and the like) can be coupled to the system either directly (such as via bus 410) or through intervening I/O controllers (omitted for clarity).

Network adapters such as network interface 414 may also be coupled to the system to enable the data processing system to become coupled to other data processing systems or remote printers or storage devices through intervening private or public networks. Modems, cable modem and Ethernet cards are just a few of the currently available types of network adapters.

As used herein, including the claims, a "server" includes a physical data processing system (for example, system 412 as shown in FIG. 4) running a server program. It will be understood that such a physical server may or may not include a display and keyboard.

As noted, aspects of the present invention may take the form of a computer program product embodied in one or more computer readable medium(s) having computer readable program code embodied thereon. Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. Media block 418 is a non-limiting example. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, radio frequency (RF), etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the figures illustrate the architecture, functionality, and operation of possible implementations of systems, methods and computer program products according to various embodiments of the present invention. In this regard, each block in the flowchart or block diagrams may represent a module, component, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be implemented substantially concurrently, or the blocks may sometimes be implemented in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

It should be noted that any of the methods described herein can include an additional step of providing a system comprising distinct software modules embodied on a computer readable storage medium; the modules can include, for example, any or all of the components shown in FIG. 1. The method steps can then be carried out using the distinct software modules and/or sub-modules of the system, as described above, executing on one or more hardware processors 402. Further, a computer program product can include a computer-readable storage medium with code adapted to be implemented to carry out one or more method steps described herein, including the provision of the system with the distinct software modules.

In any case, it should be understood that the components illustrated herein may be implemented in various forms of hardware, software, or combinations thereof; for example, application specific integrated circuit(s) (ASICS), functional circuitry, one or more appropriately programmed general purpose digital computers with associated memory, and the like. Given the teachings of the invention provided herein, one of ordinary skill in the related art will be able to contemplate other implementations of the components of the invention.

The terminology used herein is for the purpose of describing particular embodiments only and is not intended to be limiting of the invention. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

At least one embodiment of the invention may provide one or more beneficial effects, such as, for example, implementing an information extraction framework that allows specification of visual rules combined with text based rules.

It will be appreciated and should be understood that the exemplary embodiments of the invention described above can be implemented in a number of different fashions. Given the teachings of the invention provided herein, one of ordinary skill in the related art will be able to contemplate other implementations of the invention. Indeed, although illustrative embodiments of the present invention have been described herein with reference to the accompanying drawings, it is to be understood that the invention is not limited to those precise embodiments, and that various other changes and modifications may be made by one skilled in the art.

What is claimed is:

1. A method for extracting information from a formatted document, wherein the method comprises:
    combining one or more visual layout rules, one or more mark-up rules and one or more text-based rules for information extraction from a formatted document, wherein combining one or more visual layout rules, one or more mark-up rules and one or more text-based rules comprises:
    extracting all visual regions of one or more formatted documents;
    providing one or more annotations pertaining to the extracted visual regions to a spatial database; and
    creating one or more indexes on the extracted visual regions to facilitate evaluation of one or more visual layout rules; and
    specifying one or more rules from the one or more visual layout rules, one or more mark-up rules and one or more text based rules to extract information from the formatted document and converting the one or more rules into one or more queries that can be understood by the spatial database.

2. The method of claim 1, wherein the one or more visual layout rules comprise specification of a direction of a region with respect to another region.

3. The method of claim 1, wherein the one or more visual layout rules comprise an area of a region.

4. The method of claim 1, wherein the one or more visual layout rules comprise a location of a region within one or more additional regions.

5. The method of claim 1, wherein the one or more visual layout rules comprise an alignment of a set of one or more regions.

6. The method of claim 1, wherein the one or more visual layout rules comprise a distance between two or more regions.

7. The method of claim 1, wherein the one or more visual layout rules comprise a property of a region.

8. The method of claim 1, wherein the one or more visual layout rules comprise an aggregation operator.

9. The method of claim 1, further comprising storing one or more annotations with an associated visual region.

10. The method of claim 1, further comprising formatting information extracted from a formatted document in a database.

11. The method of claim 1, further comprising indexing each region extracted from a formatted document using a spatial database.

12. The method of claim 1, further comprising indexing each region extracted from a formatted document using a custom index structure.

13. The method of claim 1, further comprising using a text index in combination with a spatial index for efficient implementation of one or more rules combining text and spatial layout-based rules.

14. The method of claim 1, further comprising providing a system, wherein the system comprises one or more distinct software modules, each of the one or more distinct software modules being embodied on a tangible computer-readable recordable storage medium, and wherein the one or more distinct software modules comprise a visual region extractor module, a spatial database module, a spatial indexer module and a rules engine module executing on a hardware processor.

15. A computer program product comprising a tangible computer readable recordable storage medium including computer useable program code for extracting information from a formatted document, the computer program product including:
  computer useable program code for combining one or more visual layout rules, one or more mark-up rules and one or more text-based rules for information extraction from a formatted document, wherein computer useable program code for combining one or more visual layout rules, one or more mark-up rules and one or more text-based rules comprises:
  computer useable program code for extracting all visual regions of one or more formatted documents;
  computer useable program code for providing one or more annotations pertaining to the extracted visual regions to a spatial database; and
  computer useable program code for creating one or more indexes on the extracted visual regions to facilitate evaluation of one or more visual layout rules; and
  computer useable program code for specifying one or more rules from the one or more visual layout rules, one or more mark-up rules and one or more text based rules to extract information from the formatted document and converting the one or more rules into one or more queries that can be understood by the spatial database.

16. The computer program product of claim 15, wherein the one or more visual layout rules comprise an aggregation operator.

17. The computer program product of claim 15, wherein the one or more visual layout rules comprise at least one of specification of a direction of a region with respect to another region, an area of a region, a location of a region within one or more additional regions, an alignment of a set of one or more regions, a distance between two or more regions and a property of a region.

18. The computer program product of claim 15, further comprising computer useable program code for using a text index in combination with a spatial index for efficient implementation of one or more rules combining text and spatial layout-based rules.

19. The computer program product of claim 15, wherein the computer useable program code comprises one or more distinct software modules, and wherein the one or more distinct software modules comprise a visual region extractor module, a spatial database module, a spatial indexer module and a rules engine module executing on a hardware processor.

20. A system for extracting information from a formatted document, comprising:
  a memory; and at least one processor coupled to the memory and operative to:
  combine one or more visual layout rules, one or more mark-up rules and one or more text-based rules for information extraction from a formatted document, wherein combining one or more visual layout rules, one or more mark-up rules and one or more text-based rules comprises:
  extracting all visual regions of one or more formatted documents;
  providing one or more annotations pertaining to the extracted visual regions to a spatial database; and
  creating one or more indexes on the extracted visual regions to facilitate evaluation of one or more visual layout rules; and
  specify one or more rules from the one or more visual layout rules, one or more mark-up rules and one or more text based rules to extract information from the formatted document and convert the one or more rules into one or more queries that can be understood by the spatial database.

21. The system of claim 20, wherein the one or more visual layout rules comprise an aggregation operator.

22. The system of claim 20, wherein the one or more visual layout rules comprise at least one of specification of a direction of a region with respect to another region, an area of a region, a location of a region within one or more additional regions, an alignment of a set of one or more regions, a distance between two or more regions and a property of a region.

23. The system of claim 20, wherein the at least one processor coupled to the memory is further operative to use a text index in combination with a spatial index for efficient implementation of one or more rules combining text and spatial layout-based rules.

24. The system of claim 20, further comprising a tangible computer-readable recordable storage medium having one or more distinct software modules embodied thereon, the one or more distinct software modules comprising a visual region extractor module, a spatial database module, a spatial indexer module and a rules engine module executing on a hardware processor.

25. An apparatus for extracting information from a formatted document, the apparatus comprising:
  means for combining one or more visual layout rules, one or more mark\-up rules and one or more text-based rules for information extraction from a formatted document, wherein means for combining one or more visual layout rules, one or more mark-up rules and one or more text-based rules comprises:

means for extracting all visual regions of one or more formatted documents;

means for providing one or more annotations pertaining to the extracted visual regions to a spatial database; and means for creating one or more indexes on the extracted visual regions to facilitate evaluation of one or more visual layout rules; and means for specifying one or more rules from the one or more visual layout rules, one or more mark-up rules and one or more text based rules to extract information from the formatted document and converting the one or more rules into one or more queries that can be understood by the spatial database.

\* \* \* \* \*